United States Patent Office 3,316,337
Patented Apr. 25, 1967

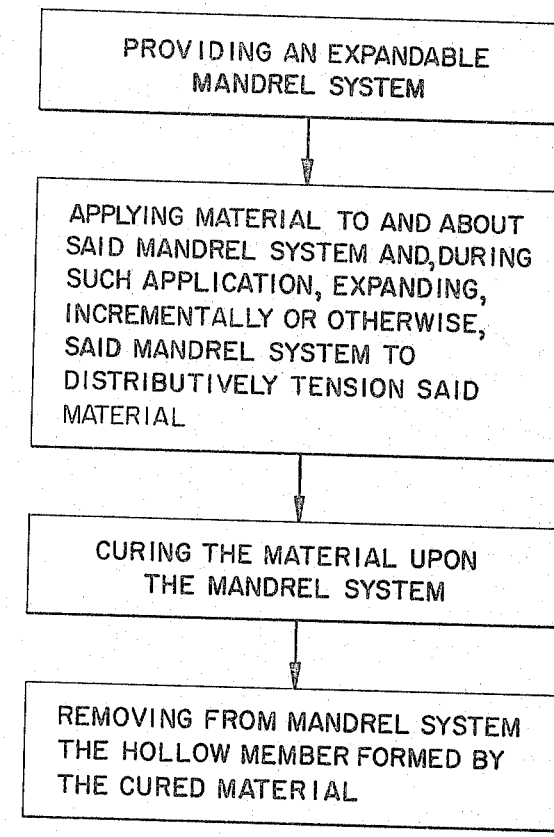

3,316,337
PROCESS FOR FABRICATING FILAMENT
WOUND HOLLOW MEMBERS
Charles J. North, Brigham City, Utah
(1552 Beavercreek Lane, Kettering, Ohio 45429)
Filed June 28, 1963, Ser. No. 291,274
3 Claims. (Cl. 264—231)

The present invention relates to processes for fabricating filament-wound hollow elements such as pressure vessels, conduits of various forms, and other types of hollow elements and, more particularly, to a new and improved process for fabricating filament-wound hollow elements of the general type described wherein the filaments employed to fabricate the desired structure are tensioned in a unique manner, this by an expanding mandrel system, during the process of fabrication so that once the intended fabrication process is completed and the ultimate product obtained, the same will be pre-stressed for strength and subject to little or no crazing either during the manufacturing process or thereafter when introduced to marked pressure environments.

The following definitions of terms used herein, which are well established in the art, will be of use to the layman in comprehending the full significance of the invention. Strand is a single glass fiber. Roving; a single end of roving is equal to a group of two hundred and four (204) glass strands. Helical is longitudinal strands. Hoop is the circumferential strands. Wet resin system is a means of coating glass roving with a thermosetting resin system while winding. Preimpregnated or "prepreg" roving; a glass roving coated with a resin system and "B" staged for ease of handling and to protect the glass strands during winding. Catenary is when fifty (50) feet of roving is stretched between two points not all strands are uniformly tensioned, some strands can sag as much as one (1) inch below the taut strands.

While the invention is equally applicable to processes for fabricating metallic filament, binder elements, and can conceivably be useful in the fabrication of other filament wound elements incorporating filaments of other materials, the present process is particularly suited to Fiberglas objects wherein glass fibers are used as reinforcement means embedded in a thermosetting resin, the latter serving as a binder.

Filament-wound, hollow elements such as pressure vessels are not new to the art. Conventional fabrication of glass wound pressure vessels includes the providing of a mandrel; winding glass roving in pre-tensioned state onto the mandrel in one or more wrapping patterns comprehending helical windings, circular winding, and polar windings, for example; introducing a suitable thermosetting resin to the roving either prior to, during, or after the wrapping process, in a manner similar to that employed in the practice of the present invention; introducing the wrapped mandrel into a curing oven; and curing the wrapped mandrel until the resin employed is cured such that the parts may be removed from the mandrel. A suitable mold release may be used if necessary between the mandrel or its surface liner and the fabricated part in order to facilitate removal of the latter from the mandrel.

Present day processes used in the fabrication of filament-wound parts have become quite sophisticated as to resin application, resin additives to be supplied, and curing cycles; however, none of the processes extant, to the inventor's knowledge, accomplishes a uniform pre-stressing and redistribution or "settling" of the filament fibers used so that a part may have optimum characteristics.

Filament-wound pressure vessels, for example, made under present processes tend to craze, that is, fracture, either during the manufacturing process or thereafter when the vessel is introduced to pressure conditions. This crazing, the inventor has established, is chiefly due to the nonuniformity in tension of the filaments of the manufactured part. Furthermore, conventional wrapping patterns enabled by filament wrapping machines will always produce high spots in a wrapped part, this due to the overlapping of the filaments at discrete areas, thereby rendering impossible an even nominal proximation to the intended contour of the vessel. The present invention, in contrast, distributes loading in the filaments and actually assists in a redistributive adjustment in the implacement of the windings so that a more uniform vessel contour is made possible. Further, by such an improvement in possibility of quite accurate contour realization which the present invention supplies, there is enabled thereby more accurate winding areas accommodating flanges, mounting means, and so forth.

Accordingly, an object of the present invention is to provide a new and improved process for fabricating a high-strength, filament-wound part.

A further object of the invention is to provide a process of making filament-wound parts wherein the filaments are pre-tensioned in a manner so as to permit the same to adjust in their disposition and thereby distribute loading, provide smooth surface contour, and otherwise lend advantageous reinforcement to the binder to be employed.

A further obpect is to provide a process for making filament wound hollow elements wherein a pre-cure period is utilized in the curing cycle of the part so that maldistribution and flow of resin, in the form of "squeeze out," will not take place in the fabrication cycle.

A further object is to provide a process for making filament-wound parts wherein chances of crazing, due to wide variations in loading of the filaments of the part, are avoided.

A further object is to provide a process for making filament-wound parts wherein intended contour of the part may be substantially realized, this notwithstanding such initial nodal points or regions which the wrapping process as applied to the filaments may produce.

The features of the present invention together with further objects and advantages thereof may best be understood by reference to the following description of the invention taken in conjunction with the drawings in which: The sole figure is a step-by-step illustration of the present invention.

Preliminarily, it should be recalled while the invention is applicable to all types of filaments used in filament-wound articles, the invention particularly pertains to glass filament-wound articles and, therefore, a brief discussion as to glass filaments and their use in filament-wound parts is now given in order that a sufficient background may be established for an understanding of the invention. As to the character of the glass filaments used is practicing fabrication in the filament winding art, the basic element is the single glass filament, 204 of which equal one "roving end." Glass roving ribbon, conventionally stored upon rolls, rollers, spools, or spindles for use in winding mandrels, now comes in sizes of from 1 to 60-end roving (with 204 filaments, as before mentioned, constituting one roving end). Twenty-end roving is the most popular in use.

The problem of equal tension of the glass filaments immediately becomes apparent if one should cut off, say, fifty feet of twenty-end roving and attach the ends thereof to two, to spaced fixed points. Even though the roving is stretched taut, it will be seen that some of the filaments will tend to sag beneath the main line of the roving. Thus, it is immediately seen that there is presented a formidable problem in supplying equal tension to all of the filaments in the roving ribbon, Conventional practice is to apply to a twenty-end roving ribbon a pre-tension of about one-half pound per roving end and gradually and then to reduce this tension as successive layers are layed upon the mandrel. This reduction in tension in conventional practice is to preclude the possibility of the first ribbon layer from "wrinkling up." In the present invention, it has been found preferable to use a constant tension on the spindle or roll from which the ribbon is derived throughout the wrapping process.

No matter how much or how little tension is applied to the roll of roving itself as the roving is being wrapped upon a mandrel, and no matter how sophisticated or expensive the wrapping machinery may be, it has been proven to be quite impossible to get any realistic uniformity in the tensioning of the glass fibers constituting the roving; consequently, weak spots in the finished product occurs as well as extreme likelihood of crazing or fracturing of the part under pressure or during the fabrication, and this as well as irregularity in the surface contour of the part, particularly in those areas where radii of curvature are short.

The present invention takes the advantage of a completely new approach in, in effect, expanding the mandrel system so as to distribute loading among the filaments prior to and during the cure cycle. This, it has been found, redistributes the filaments so as to reduce substantially the prominence of filament nodal or cross-over regions present and also to distribute the loading of the filaments so that the desired results are obtained.

Accordingly, and as seen in the sole figure, the first step in the process is to supply an expandable mandrel system upon which the filaments are to be wrapped. A mandrel member per se may of course be made expandable by any screw or lever/and power means whereby, with the application of suitable pneumatic, hydraulic, screw or lever pressure, the mandrel itself is expanded so as to exert radial pressure against the hollow part being fabricated as its wrapping about the mandrel is in progress or has been completed. Other ways may be used to accomplish mandrel system expansion as, for example, the application of a bladder or membrane disposed about a mandrel, with its inner surface being in communication with pneumatic or hydraulic means, communicable through the mandrel, to apply an outward force upon the bladder or membrane throughout its operative area disposed in engagement with the filaments wound thereupon. Whatever the means used, it is essential in the practice of the present invention that the part upon which the filaments are wound be capable of expanding outwardly so as to apply tension to the filament wrappings thereof.

The second step in the process is to provide suitable glass filaments for wrapping upon the expandable mandrel system hitherto mentioned. Suitable types of filaments are as follows:

(1) "E" Glass 801 finish
(2) "E" Glass HTS finish
(3) YM30A Glass
(4) X-994 Glass finish, or
(5) S-Glass The above glass filament fibers are manufactured in various types of roving by most glass manufacturers, with the Owens Corning Glass Company manufacturing all of the same. The type of ribbon, that is 1 to 60 end roving, will be selected and this generally will be of the twenty-end roving type.

The next step in the process is to wrap the glass filament roving ribbon around the mandrel, thus using helicals, circs, and polar wrappings in any conventional manner as may be dictated as by the contour of the part to be fabricated. As this wrapping process is begun, it is desirable that a suitable tension be applied to the roving at its spindle or roll source. The tension of the roving should be about one-half pound per roving end, which can be kept at this figure throughout the wrapping process.

Accordingly, the next and an optional step, depending upon the context of usage, will be to apply progressively stepped, increasing, outward pressures of the mandrel system upon the filament as successive layers of roving are deposited upon the mandrel system. Here, the pressures to be applied as well as the incremental steps in pressure used will all depend upon the application, the type of glass and the amount applied, as well as the size of the vessel being fabricated. It will be noted that this step function in the mandrel system pressure applied to the filament wrapping enables a preliminary readjustment of the first winding at a relatively low pressure and, as the succeeding layers are layed up and progressively higher pressures applied by the mandrel to the filaments, there is enabled further adjustment of both the original and subsequent layers.

At this point it becomes necessary to consider the type of resin to be used and its application to the filaments on the mandrel.

As to the types of resin to be used, the same will be a thermosetting resin which, by its inherent nature or its additives, is capable of curing at any desired temperature such as from room temperature to perhaps 300-500° F. The useable thermosetting resins comprise a group including epoxy resins, phenolic resins, polyester resins, silicone resins, and so forth.

Now, as to the application of the resin to the filament, there are several ways in which this can be performed. One manner, of course, is to dip the entire unit after the wrapping process is completed into a tank in order that the resin can come into contact with the filaments. If this process is used then it will comprise the next step. However, experience has proven that it is quite impracticable to employ this method in applying resins in the fabrication of a filament part.

A more satisfactory method of applying resin to the part being fabricated is to coat or "pre-impregnate" the glass filaments prior to its use. Presently, pre-impregnated glass filament roving is supplied by vendors handling the same and is referred to as "B-stage" roving. The roving is supplied such that the resin thereof is not "cured" and yet is not tacky so that the roving will stick to the roll during fabrication of the part. Yet, transfer of the wrapped mandrel to an oven to introduce the part to a heated environment will cause the resin in pre-impregnated roving to flow and, ultimately, to cure.

A modification of the above is for the manufacturer simply to utilize a "wet system," that is, pass the roving through a resin bath, wind the same upon a roll and then deposit it in storage under refrigeration, subsequently to be withdrawn and used as in the case of B-stage pre-impregnated roving.

A final method of applying resin to the glass filament is simply to utilize a direct wet system wherein the roving is passed through a resin bath and applied immediately as wrapping to the mandrel.

In certain applications, and as a next and optional step in the invention, the inventor has found it desirable to allow the wrapped mandrel system to set simply at room temperature, with the mandrel system at this time being expanded under pressure so as to pre-stress the part and thus apply tension to the wrapped filaments. If the part is allowed to stand at room temperature for the time required to allow the filaments to adjust (and from 10 hours to several days may be needed, this depended upon the desired wall thickness of the vessel being formed) to equal tension loading and to slight reorientation as to filament disposition for producing a satisfactory part contour, then many desirable results will obtain. Now this mandrel pressure, instead of being stepped during the process of wrapping as hereinbefore explained, can be simply applied after the wrapping is completed in order that the part may be subject to mandrel pressure for a time sufficient for the filaments to adjust themselves.

Whether or not the previous step is used, it is, almost always, quite important to utilize as a succeeding step the introduction of the wrapped mandrel into an oven for a low-temperature pre-cure. Now this pre-cure can simply be accomplished at room temperature, this depending upon the resin binder used. Generally, the practice will be for a pre-cure temperature to be imposed upon the wrapped mandrel in an oven, with the temperature varying from room temperature to say 135° F., this depending upon the type of thermosetting resin used. The purpose of this low temperature precure step is to drive off volatiles from the resin and also to reduce resin flow to zero or nearly zero, so that when increased temperature is used in the curing cycle, a partial cure will have resulted so as to preclude the resin from being squeezed out of the lower roving under mandrel pressure. This is a very important point.

The mandrel pressure will be continued to be applied during the pre-cure cycle and also throughout the final curing cycle.

Once the resin has been partially cured as above mentioned in the previous step in connection with pre-cure, then the environmental temperature of the wrapped mandrel is raised and the part cured in a time cycle corresponding to that required for the resin used. Both the time duration of the final cure and the temperature of cure will, again, depend upon the type of resin used.

Once the part is finally cured, then the wrapped mandrel is removed from the curing oven and the part removed from the mandrel.

It has been discovered that the use of the above described process of fabricating filament wrapped parts results in a very strong, accurately contoured, pre-stressed, manufactured part, one which will resist crazing both during the fabrication process and particularly in high pressure environment when in actual use thereafter, all of this owing to the redistribution of filament disposition and uniformity in pre-loading the filaments so that substantially equal loading of the filaments is maintained in the fabrication process and thereafter.

To recapitulate, after the roving has been coated with an uncured thermosetting resin system binder, which can be a wet system or a prepreg system. The roving is then applied by a layer or layers over the mandrel. (These layers of roving are known as the helical and hoop windings and are applied over the mandrel at normal wrapping tension, known to the art as being one-and-one-half (1½) to three (3) pounds of tension per roving end.) With the uncured filament wound part at this stage or after all the desired layers have been applied over the mandrel, the mandrel is then expanded to increase the tension to two (2) to four (4) pounds of tension per roving end. After this increase in tension has been applied, the part being fabricated shall remain under this expanded tension condition throughout the balance of the process, which would depend on the number of layers having been applied in regards to the time element involved. While the part being fabricated is in this expanded uncured stage, the glass strands will re-adjust; thus, each strand becomes uniformly stress loaded and eliminates the catenary condition of the roving.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. A process for fabricating a filament-wound hollow member comprising the steps of providing an expandable mandrel system; applying a layer of material to constitute said hollow member and comprising filament reinforcement means wound about said mandrel system and a thermosetting resin binder in intimate contact with said filament reinforcement means and permeating said material, onto said mandrel system; expanding said mandrel system to apply pressure to the interior surface of said hollow member and thereby distributively tensioning said filament reinforcing means; curing said material upon said mandrel system; and removing the hollow member formed by said material from said mandrel system after sufficient curing has taken place, and wherein the step of expanding said mandrel system is at least in part performed concurrently with the said step of applying the layer of material and, therein, during the winding of said filament reinforcement means upon said mandrel system.

2. The process of claim 1 wherein the expansion of said mandrel system is performed in a series of progressive, incremental steps during the process of applying successive layers, when made, of said filament reinforcing means by their being wrapped upon said mandrel system.

3. A process for fabricating a filament-wound hollow member comprising the steps of providing an expandable mandrel system; applying a layer of material to constitute said hollow member and comprising filament reinforcement means wound about said mandrel system and a thermosetting resin binder in intimate contact with said filament reinforcement means and permeating said material, onto said mandrel system; expanding said mandrel system to apply pressure to the interior surface of said hollow member and thereby distributively tensioning said filament reinforcing means; curing said material upon said mandrel system; and removing the hollow member formed by said material from said mandrel system after sufficient curing has taken place and wherein said filament reinforcement means is wrapped under nominally constant tension upon said mandrel system in said layer applying step, the pressure upon said material as produced by said expanding of said mandrel system being sustained at least in part through said layer applying step and for an interval of time thereafter.

References Cited by the Examiner

UNITED STATES PATENTS

| 1,326,991 | 1/1920 | Swinehart | 264—231 |
| 2,549,144 | 4/1951 | Truscott | 264—231 |
| 2,862,541 | 12/1958 | Brink. | |
| 2,995,781 | 8/1961 | Sipler | 264—137 |
| 3,004,579 | 10/1961 | Hutch | 264—231 XR |
| 3,040,383 | 6/1962 | Nassimbene | 264—236 XR |
| 3,128,322 | 4/1964 | Young | 264—314 |
| 3,265,795 | 8/1966 | Medney | 264—231 |

FOREIGN PATENTS 821,638  10/1959  Great Britain.

ROBERT F. WHITE, *Primary Examiner.*

ALEXANDER H. BRODMERKEL, *Examiner.*

M. R. DOWLING, R. KUCIA, *Assistant Examiners.*